J. LACEY & G. B. CORNELL.

Improvement in Bushes for Bungs.

No. 5,027. Reissued Aug. 6, 1872.

Witnesses
N. H. Sherburne
J. W. Merriam

Inventor
George B. Cornell
by Sherburne & Co
Attorneys

THE NORRIS PETERS CO., PHOTO-LITHO., WASHINGTON, D. C.

UNITED STATES PATENT OFFICE.

JOHN LACEY AND GEORGE B. CORNELL, OF CHICAGO, ILLINOIS; SAID LACEY ASSIGNOR TO G. B. CORNELL.

IMPROVEMENT IN BUSHES FOR BUNGS.

Specification forming part of Letters Patent No. 118,617, dated August 29, 1871; reissue No. 5,027, dated August 6, 1872.

DIVISION B.

*To all whom it may concern:*

Be it known that we, JOHN LACEY and GEORGE B. CORNELL, of Chicago, in the county of Cook and State of Illinois, have invented a new and Improved Metallic Bushing for the Bungs of Barrels, Casks, &c.; and we do hereby declare the following to be a full, clear, and exact description thereof, which will enable others skilled in the art to which the said invention appertains to make and use the same, reference being had to the accompanying drawing forming part of this specification, in which—

Figure 1:
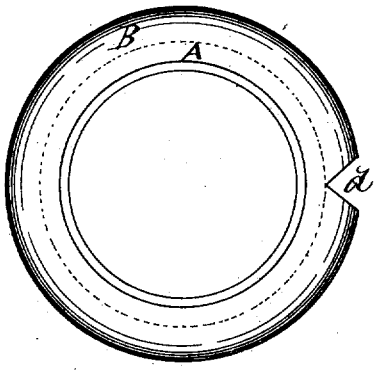
Figure 2:
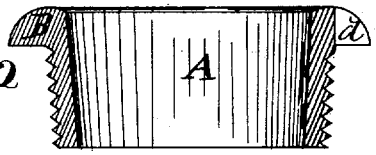

Figure 1 is a top view or plan of a bushing embodying the said improvement, and Fig. 2 is a vertical central section of the same.

Similar letters of reference indicate like parts in both figures of the drawing.

The said invention relates to means for protecting the bungs of barrels, casks, &c.; and the improvement consists in a metallic bushing for lining the periphery of the aperture, the arrangement of which will be more fully understood by the following description:

In the drawing, A represents the bushing proper which consists of an annular ring of metal. This ring is made tapering on both its outer and inner sides, as shown in Fig. 2, and is screw-threaded upon its outer side, by which means the same is secured within the aperture in the cask. This thread may be formed by a suitable tool, or may be formed in the mold, as found most advantageous. The larger end of the said ring is provided with a flange, B, the outer surface or periphery of which is made in an ovolo shape, and is provided with a V-shaped notch, *d*, which extends inward to a point near the body of the ring, as shown in Fig. 1. The object of this notch is to allow a suitable wrench, adapted for the purpose, to engage therewith, whereby the said bushing may be turned into place without the wrench slipping from its seat, as would be the case with a bushing having a smooth surface. It will be observed by reference to the drawing that the aperture in the bushing is made larger at the end uniting with the flange than that of the opposite end, the object being to allow the stopper or bung to be more readily introduced, also to insure a more perfect fit by compressing the stopper as it is driven into place. It will also be observed that the outer side of the said ring or bushing is larger at the end uniting with the flange than the opposite end, the object being to allow the same to be more readily introduced into the aperture in the cask and to form its own thread in the wood as it is turned into place, thereby insuring a tight joint.

Having thus described our invention, we claim—

The screw-threaded metallic bung-bushing, made tapering upon both its outer and inner sides, and provided with the flange B having the V-shaped notch *d*, as and for the purpose described.

JOHN LACEY.
GEO. B. CORNELL.

Witnesses:
J. W. MERRIAM,
N. H. SHERBURNE.